C. AND F. CASEY.
MACHINE FOR WAXING STRAWS OR TUBES.
APPLICATION FILED MAY 17, 1916.

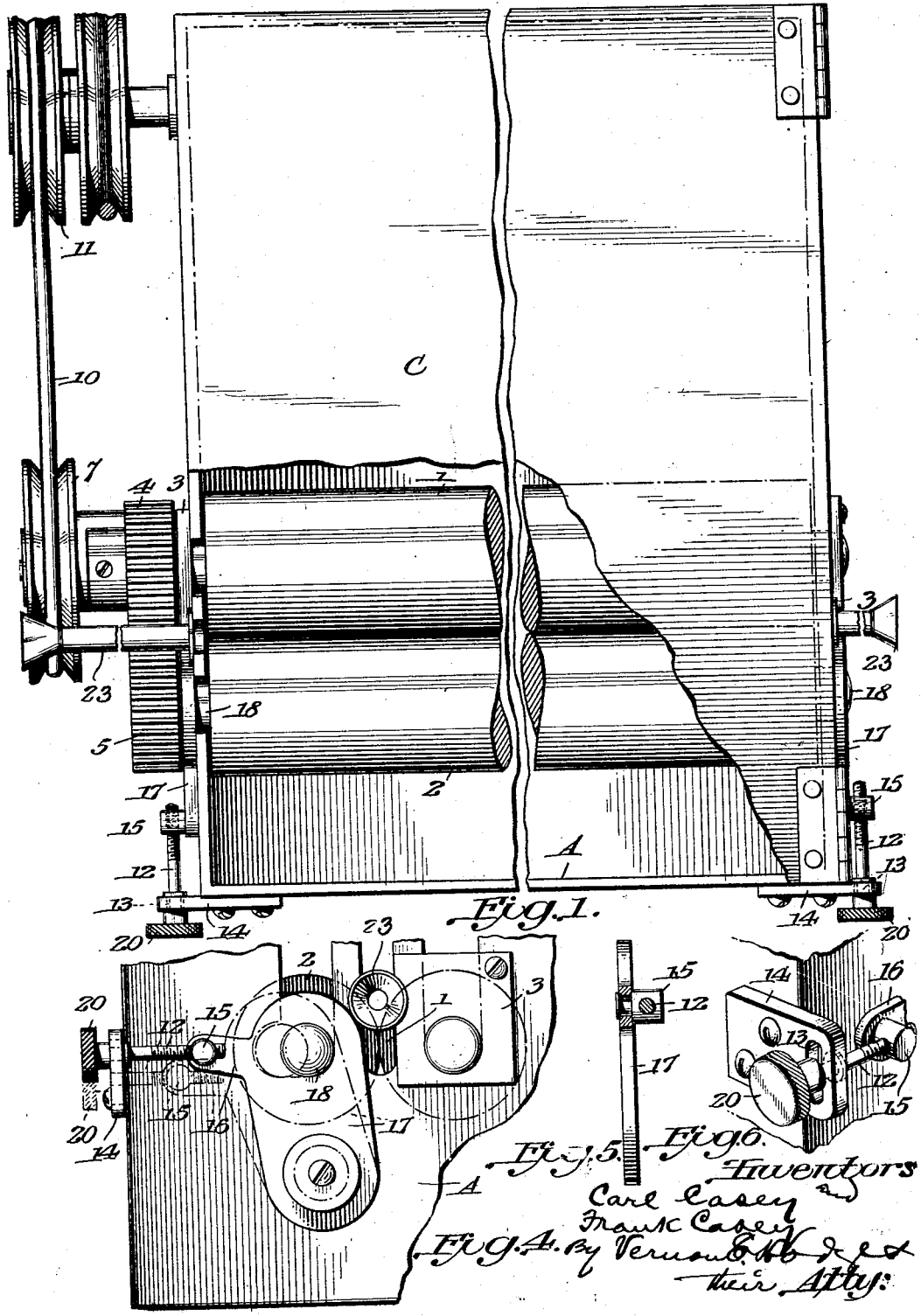

1,325,351. Patented Dec. 16, 1919.
2 SHEETS—SHEET 2.

UNITED STATES PATENT OFFICE.

CARL CASEY AND FRANK CASEY, OF WASHINGTON, DISTRICT OF COLUMBIA.

MACHINE FOR WAXING STRAWS OR TUBES.

1,325,351.      Specification of Letters Patent.      Patented Dec. 16, 1919.

Application filed May 17, 1916. Serial No. 98,136.

*To all whom it may concern:*

Be it known that we, CARL CASEY and FRANK CASEY, citizens of the United States, residing at Washington, in the District of Columbia, have invented certain new and useful Improvements in Machines for Waxing Straws or Tubes, of which the following is a specification.

Our invention relates to an improvement in machines for waxing straws or tubes, more especially the artificially wound straws which heretofore by a process of immersion and centrifugal action have been waxed inside and out, and the superfluous wax thrown off.

In our present invention it is our purpose to wax the straws or tubes on the exterior only by the contact of the rapidly revolving and the forwardly-moving straw with two or more slowly revolving rolls, the surfaces of which are partly submerged in the melted wax, and which as they turn come rapidly in contact with the surfaces of the straw or tube, which latter is of an absorbent material, which quickly absorbs and becomes coated with the wax during its moving contact with the roller.

In the accompanying drawings:—

Figure 1 is a plan view of our improved waxing-machine;

Fig. 4 is a fragmentary view from one side;

Fig. 5 is a fragmentary view from the end; and

Fig. 6 is a detail in perspective.

Figure 3:
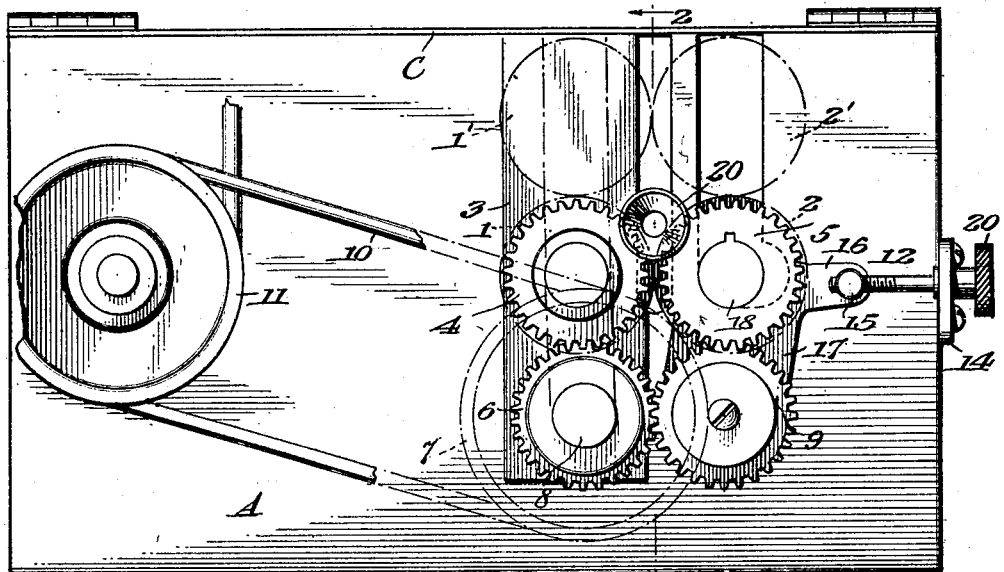
Fig. 3 is an end elevation.
Figure 2:
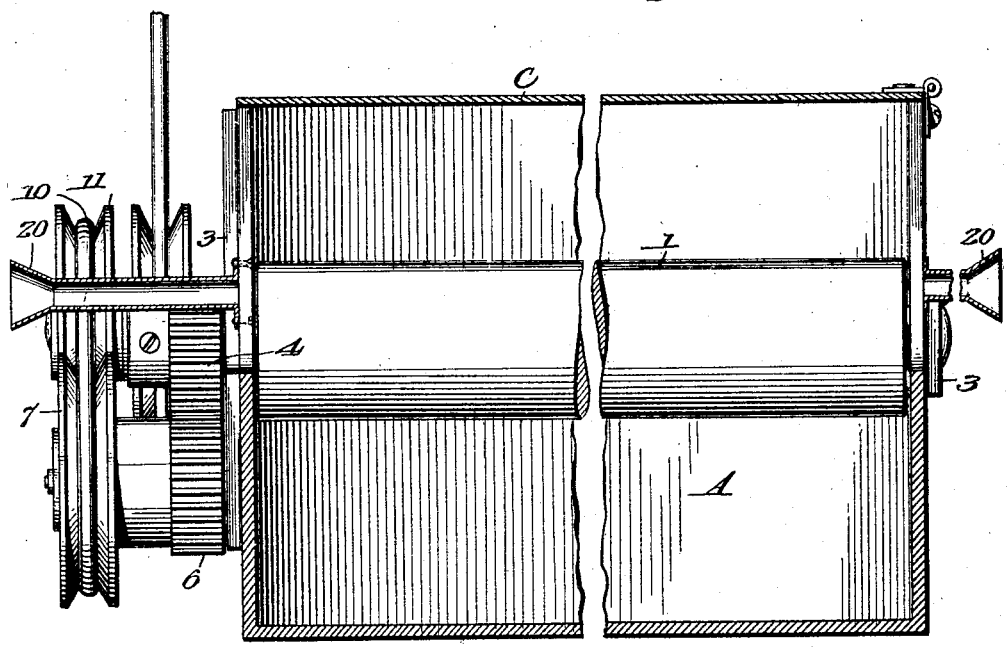
Fig. 2 is a sectional view.

A, is a receptacle or tank in which the wax is placed and kept in a melted and sufficiently heated condition by any suitable heat applying means, such as a coil or a burner (not shown). The tank or receptacle A is adapted to be placed on a tube or straw-making machine at a point between the spinning mechanism and the cut-off, so that the straw or tube is preferably waxed just prior to its being cut into straw or tube lengths from the main forming straw or tube.

Journaled in the opposite ends of the wax tank or receptacle are two or more rolls 1 and 2. These may be of any length and diameter, and for the best work we propose to make them in the neighborhood of three feet in length and perhaps an inch and a quarter or a half in diameter, with their bearings at the ends journaled in boxes 3, 3, at the opposite ends of the tank or receptacle.

On one end of these rolls 1 and 2, the gear-wheels 4 and 5 are secured respectively, and in order to drive the two rolls in opposite directions and from the same source of power a main gear-wheel 6 on the hub of a pulley 7 mounted on the stud 8 meshes with the gear-wheel 4, and also with an intermediate gear-wheel 9, the teeth of which engage the gear-wheel 5, so that as the belt 10 which passes over the idle-pulley 11 to the pulley 7 is driven, the rolls 1 and 2 are turned in opposite directions at the desired speed.

One roller, namely roller 2, is laterally adjustable in any approved manner, and a simple means for accomplishing this consists in the screws 12, 12, at opposite ends of the tank or receptacle. These are swiveled in slots 13, 13, in the plates 14, 14, secured to the receptacle and turn in the threaded posts 15, 15, which are pivoted in the stems 16, 16, of the rocker-plates 17, 17, in which the trunnions 18, 18, of the roll 2 turn. So by turning the thumb-screws 20, 20, on the ends of the screws 12, 12, in one direction, the roll 2 is moved away from roll 1, and by reversing them, the roll is moved in the opposite direction. Thus it will be understood that the plate 17 is pivoted on the stud which supports the gear 9, and due to this structure the gear 5 will be rocked in the arc of a circle having the supporting shaft or stud of the gear 9 as a center, thereby preventing any binding of the gears 5 and 9.

The object of this adjustment is to regulate the amount of wax fed by the rollers to the straws or tubes being formed. By adjusting the rollers closer to each other, the feed is less, and by moving them apart it is obviously greater. This adjustment, along with the speed of the rolls, will regulate the supply of wax to a nicety, which can readily be determined as the work of waxing the straws or tubes progresses. Not only could other means of adjustment be provided, but both rolls might be adjusted, if desired.

Also in addition to the two rolls described, we might find it desirable to employ two additional rolls 1', 2', as shown in dotted lines in Fig. 3, one immediately above each of the rolls 1 and 2, thus forming an opening between the four rolls through which the straw or tube must be fed, and from which it could not possibly escape except at the end, and which would absolutely insure repeated contact with the wax-coated rolls during its forward rotary passage therethrough.

A guide 23 at one end insures the entrance of the straw between the rolls, and keeps it out of contact with the gears.

The paper straw or tube is preferably formed in the accustomed manner on a fixed mandrel 21, by means of the belts 22, 22, and the straw or tube thus formed is not only moved endwise with considerable rapidity, but it is also rotated in the process of forming at a high speed. In that way its entire outer surface comes in repeated contact with the slowly moving waxing rolls 1 and 2, or 1, 2, and 1', 2', as the case may be, thus insuring every particle of its surface being well and sufficiently and uniformly coated with wax.

C is a cover that may be hinged or otherwise connected with the receptacle A for closing the latter.

It is obvious that other more or less slight changes might be resorted to besides those described in the form and arrangement of the several parts, without departure from the spirit and scope of our invention, and hence we do not wish to limit ourselves to the exact construction herein set forth, but:—

We claim:

1. A machine for waxing straws or tubes comprising a wax receptacle, guides at opposite ends thereof, wax rolls some of which at least are partly submerged in the wax and extend from guide to guide on opposite sides thereof, so that the said rolls practically form an unbroken continuation of the guides within the wax receptacle and in general alinement therewith.

2. A tube or straw waxing machine comprising a receptacle in which the wax is contained, rotary rolls partly submerged therein in contact with which the straw or tube travels in an endwise rotary movement, means pivoted at opposite ends of the receptacle forming bearings for one of the rolls, and a swiveled screw having screw connection with said pivotal means whereby when turned the position of the roller would be adjusted.

3. A tube or straw waxing machine comprising a receptacle in which the wax is contained, rotary rolls partly submerged therein in contact with which the straw or tube travels with an endwise rotary movement, and means for regulating the space between said rolls, said means comprising swiveled screws and plates in which the ends of one of the rolls turn, said plates having pivoted screw-threaded posts in the threads of which the screws turn, whereby when the screws are turned the adjustable roll is moved toward or away from the other roll.

In testimony whereof we affix our signatures.

CARL CASEY.
FRANK CASEY.